(12) United States Patent  (10) Patent No.: US 8,272,132 B2
Bolgert  (45) Date of Patent: Sep. 25, 2012

(54) SERVING UTENSIL HAVING PAN LIFTING ELEMENT

(75) Inventor: Paul Bolgert, Sheboygan, WI (US)

(73) Assignee: PW Stoelting, L.L.C., Sheboygan, WI (US)

( * ) Notice: Subject to any disclaimer, the term of this patent is extended or adjusted under 35 U.S.C. 154(b) by 164 days.

(21) Appl. No.: 12/821,795

(22) Filed: Jun. 23, 2010

(65) Prior Publication Data

US 2011/0314679 A1  Dec. 29, 2011

(51) Int. Cl.
*A47J 43/28* (2006.01)
(52) U.S. Cl. .............. 30/327; 30/298.4; 30/324
(58) Field of Classification Search ............ 30/295, 30/298, 4, 323, 327, 324, 325, 328, 340, 30/342, 343, 344; 76/105; D7/401.2, 653
See application file for complete search history.

(56) References Cited

U.S. PATENT DOCUMENTS

| | | | | |
|---|---|---|---|---|
| 275,112 | A | * | 4/1883 | Aldom .......................... 30/327 |
| 356,453 | A | * | 1/1887 | Cox .............................. 30/295 |
| 416,736 | A | * | 12/1889 | McPherson .................... 7/112 |
| 489,414 | A | * | 1/1893 | Feicker ......................... 30/323 |
| 883,623 | A | * | 3/1908 | Chandler ...................... 30/324 |
| 912,146 | A | * | 2/1909 | Moffett ........................ 30/353 |
| D51,369 | S | * | 10/1917 | Galpin ......................... D7/654 |
| 1,406,135 | A | * | 2/1922 | Abrell .......................... 30/327 |
| 1,822,828 | A | * | 9/1931 | Stueckman ................... 30/144 |
| 1,960,651 | A | * | 5/1934 | Swazey ...................... 30/279.2 |
| 2,153,759 | A | * | 4/1939 | Katzinger ..................... 30/295 |
| 2,688,143 | A | * | 9/1954 | Stoa ............................... 7/156 |
| 2,789,349 | A | * | 4/1957 | Lee ............................. 30/298.4 |
| 2,853,780 | A | * | 9/1958 | Bull ............................... 30/327 |
| 2,901,824 | A | * | 9/1959 | Zullo ............................. 30/295 |
| 3,481,038 | A | * | 12/1969 | Cooper .......................... 30/344 |
| 3,683,452 | A | | 8/1972 | Rickmeier, Jr. et al. |
| 3,703,326 | A | * | 11/1972 | Riviers ...................... 312/348.3 |
| 4,231,128 | A | * | 11/1980 | James ............................. 7/112 |
| D282,708 | S | | 2/1986 | Schaeffer |
| D291,046 | S | | 7/1987 | Johnson |
| D292,663 | S | | 11/1987 | Johnson |
| D293,295 | S | | 12/1987 | Johnson |
| D302,455 | S | * | 7/1989 | Hibben ....................... D22/118 |
| D306,955 | S | | 4/1990 | Mehta et al. |
| D312,749 | S | | 12/1990 | Kessler |
| D323,768 | S | | 2/1992 | Friederichs |
| D326,033 | S | | 5/1992 | Friederichs |
| 5,326,248 | A | | 7/1994 | Thuecks et al. |
| 5,699,614 | A | | 12/1997 | Garneau |
| D393,776 | S | | 4/1998 | Kessler |
| 5,867,867 | A | | 2/1999 | Kessler |
| D417,595 | S | | 12/1999 | Mittmann |
| 6,039,372 | A | | 3/2000 | Noe et al. |
| 6,092,670 | A | | 7/2000 | Marriott |

(Continued)

*Primary Examiner* — Hwei C Payer
(74) *Attorney, Agent, or Firm* — Foley & Lardner LLP

(57) ABSTRACT

The present invention is directed to a serving utensil for selectively engaging a serving pan for removal from a steam table. The utensil is of the type used in buffet-style service settings. The utensil includes a serving element on one end and a handle on the other end. The serving element may comprise a bowl, tines, prongs, tongs and the like. The handle includes a flange extending from a face thereof for selectively engaging the serving pan of the steam table such that the flange is selectively insertable between the pan and the steam table such that the user may lift the serving pan from the steam table for removal of the serving pan for cleaning or replacement.

14 Claims, 9 Drawing Sheets

U.S. PATENT DOCUMENTS

| | | |
|---|---|---|
| 6,115,921 A | 9/2000 | Garneau |
| 6,408,524 B1 * | 6/2002 | Lai ................................. 30/324 |
| 6,421,921 B1 | 7/2002 | Garneau |
| 6,502,314 B1 * | 1/2003 | McCatty ........................ 30/340 |
| D486,041 S | 2/2004 | Siehr et al. |
| D486,354 S | 2/2004 | Bratton et al. |
| D486,359 S | 2/2004 | Siehr et al. |
| 6,705,210 B2 | 3/2004 | Leonard |
| 7,013,569 B2 * | 3/2006 | Holler ............................ 30/295 |
| D520,295 S | 5/2006 | Schreiber-Pethan et al. |
| D520,810 S | 5/2006 | Kessler et al. |
| D536,575 S | 2/2007 | Schreiber-Pethan et al. |
| 7,219,767 B1 | 5/2007 | Steinbok |
| D555,438 S | 11/2007 | Schreiber-Pethan et al. |
| D555,985 S | 11/2007 | Schreiber-Pethan et al. |
| D560,980 S | 2/2008 | LeGreve et al. |
| D564,293 S | 3/2008 | Wasserman et al. |
| D564,294 S | 3/2008 | Wasserman et al. |
| D564,833 S | 3/2008 | de Bretton Gordon |
| D572,525 S | 7/2008 | de Bretton Gordon |
| 7,395,602 B2 * | 7/2008 | Backus et al. ................. 30/322 |
| 7,490,732 B2 | 2/2009 | Wasserman et al. |
| D595,546 S | 7/2009 | LeGreve et al. |
| 7,690,704 B2 * | 4/2010 | Bixel .............................. 294/25 |
| D655,979 S * | 3/2012 | Bolgert ....................... D7/401.2 |
| 2005/0081385 A1 * | 4/2005 | Ho .................................. 30/123 |
| 2005/0229406 A1 * | 10/2005 | Lai ................................. 30/324 |
| 2005/0278958 A1 | 12/2005 | Schmidt |
| 2006/0053638 A1 | 3/2006 | Sumner-Trivisani et al. |
| 2006/0185177 A1 * | 8/2006 | Simard .......................... 30/327 |
| 2006/0213033 A1 | 9/2006 | Wasserman et al. |
| 2006/0225725 A1 | 10/2006 | Rinaldo |
| 2007/0006470 A1 | 1/2007 | Sumner-Trivisani et al. |
| 2007/0084063 A1 * | 4/2007 | Hughes ........................ 30/298.4 |
| 2007/0138191 A1 | 6/2007 | LeGreve |
| 2007/0214650 A1 * | 9/2007 | Tomazini ....................... 30/142 |
| 2007/0262089 A1 | 11/2007 | LeGreve |
| 2008/0135711 A1 | 6/2008 | Bunting |
| 2008/0169294 A1 | 7/2008 | Liebzeit |
| 2008/0169295 A1 | 7/2008 | Liebzeit |
| 2008/0185390 A1 | 8/2008 | Liebzeit |
| 2008/0296307 A1 | 12/2008 | Liebzeit |

* cited by examiner

SERVING UTENSIL HAVING PAN LIFTING ELEMENT

BACKGROUND OF THE INVENTION

1. Field of the Invention

The present invention is directed to a serving utensil and more particularly to a serving utensil having means for selectively engaging and assisting in lifting a serving pan from a steam table assembly so that it may be moved to another location.

2. Discussion of the Related Art

In the food service industry, utensils for serving food from buffets and food stations (collectively, buffets) are well known. As is generally understood, buffets generally include one or more serving stations in which patrons can serve themselves from a number of food options, or alternatively, a member of the food service staff may be located at the stations for serving food to the patrons. In either case, these stations commonly comprise a table supporting one or more steam tables. Steam tables comprise an outer support that is configured to removably secure a pan therein. The pan comprises a cavity for receiving the food item to be held in the steam table for maintaining the contents of the pan either cool or warm as desired, and the pan is selectively removable from the support such that it may be replaced by a new pan when the pan is emptied and in need of cleaning. In this manner, a number of pans may be prepared at a remote location and simply brought out to the serving stations as needed.

The pans typically include a generally rectangular cross section, though they may comprise any number of alternative cross sectional shapes. The pans comprise a pair of end walls and a pair of sidewalls disposed between each of the end walls, a bottom wall, and an opening opposite the bottom wall, thereby defining a cavity therewith for receiving the food item to be served. Each of the side walls and/or end walls includes an upper lip portion protruding upwardly from their upper edges. When the pan is supported within the steam table, the lip portion is in supported engagement with a top wall of the steam table to thereby secure the pan to the steam table.

The utensils typically used with steam tables are generally serving utensils adapted for serving food in a relatively expedient manner. These utensils comprise a handle opposite a serving portion such as a bowl, prongs, tines, tongs, and the like. The utensils commonly employed with steam tables are generally large such that they are able to handle relatively large amounts of food in a short amount of time.

In use, pans need to be repeatedly removed from the steam table for refilling, replacement, cleaning, and other reasons. Pan configurations have made it difficult to remove the pans from steam tables. Typically, lifting is accomplished by wedging a finger, utensil or other tool under the lip-portion to begin lifting the pan. Such actions may be rather dangerous to a person trying to lift the pan from the steam table since uncontrolled escape of steam may burn the person's hand. It is rather common practice for personnel to attempt to facilitate this initial lifting step by intentionally and permanently deforming the lip-portion in one or more places to provide a gripping place or to facilitate a wedging step. Such lip deformation breaks the "seal" between the pan and the table top, which results in harmful heat losses or gains. This can greatly decrease steam table efficiency by raising the use of power for maintaining the desired temperature, not to mention the fact that the appearance of the pan is ruined. Thus, a safe and efficient apparatus and method for removing a pan from a steam table is desired.

To overcome at least some of the foregoing disadvantages, specialized tools have been used to lift pans out of their respective trays. Such tools typically comprise a hook or similar such construction for lifting the pans from the trays. These specialized tools require storage when not in use and comprise yet another expense for the operators of the buffet.

It is therefore desired to provide a tool capable of more efficiently lifting serving pans from steam table while maintaining the appearance of the pans and preventing injury to the person lifting the serving pan. Further, it is desired that such a tool be relatively inexpensive and easy to make. In addition, it is desired that such tool be relatively inconspicuous and easily integrated into the workflow operations of a typical buffet.

SUMMARY AND OBJECTS OF THE INVENTION

The present invention is directed to a serving utensil that includes means attached to a portion of the utensil for lifting serving pans or trays from a steam table or the like. The utensil includes a serving end opposite a grasping end. The serving end includes means for serving food. For example, the serving end may include tines, a bowl, tongs, ladle, or other such serving means. The grasping end includes a handle for grasping by a user thereof. A pan lifting means is positioned between the serving end and a grasping end. The pan lifting means is configured to allow an operator to securely lift the serving pan such that he or she may grasp the pan with his or her, preferably gloved, hand and move it to another location. In one embodiment of the present invention, the pan lifting means is coupled to the handle. The pan lifting means generally extends downwardly from the utensil and terminates in a flange portion that is adapted to engage at least a portion of the serving pan. In one embodiment, the flange portion of the pan lifting means is configured for engagement with a portion of the serving pan such that the pan lifting means abuts at least a portion of the serving pan while the flange portion engages the serving pan. The flange portion may be integrally molded to the handle of the utensil. The flange portion comprises a length sufficient to enable it to engage in edge of the serving pan. Similarly, the flange portion comprises a width sufficient to allow insertion of the flange portion between the serving pan and the steam table. The handle generally comprises a forward end proximate the serving end of the utensil. The forward end of the handle comprises a relative width greater than the rest of the handle. In this manner the operator's hands are prevented from being contacted by the serving pan while the utensil is being used to lift the serving pan.

In yet another embodiment of the present invention, the utensil may comprise a first end having a serving element disposed on it in a second end opposite the first end, wherein the second end carries a handle thereon. A shank is disposed between the first end and the second end. A pan lifting element is disposed on the handle and extends toward the first end of the utensil. The pan lifting element is configured to engage an edge of the serving pan for allowing a user to lift the serving pan with the utensil. The pan lifting element or maybe integrally formed with the handle or otherwise attached to the handle. The handle includes a forward end proximate the first end and a rearward end proximate the second end. The pan lifting element may be disposed on the forward end of the handle. The forward end of the handle generally comprises a width greater than the remainder of the handle. In this way, the user's hand is protected from the serving pan by the width of the forward end of the handle. The pan lifting element may be integrally formed with the forward end of the handle and comprise a substantially downwardly extending slightly curved portion for abutting the serving pan. It may also include a flange integrally formed with the curved portion and extending toward the first end of the utensil. The flange is preferably sized and shaped to engage an edge of the serving pan. Similarly, the flange is positioned such that it is engageable with an underside of the edge of the serving pan when the serving element is inserted into the cavity of the serving pan. The flange generally extends downwardly from a posterior portion of the utensil.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DETAILED DESCRIPTION OF THE INVENTION

Figure 1:
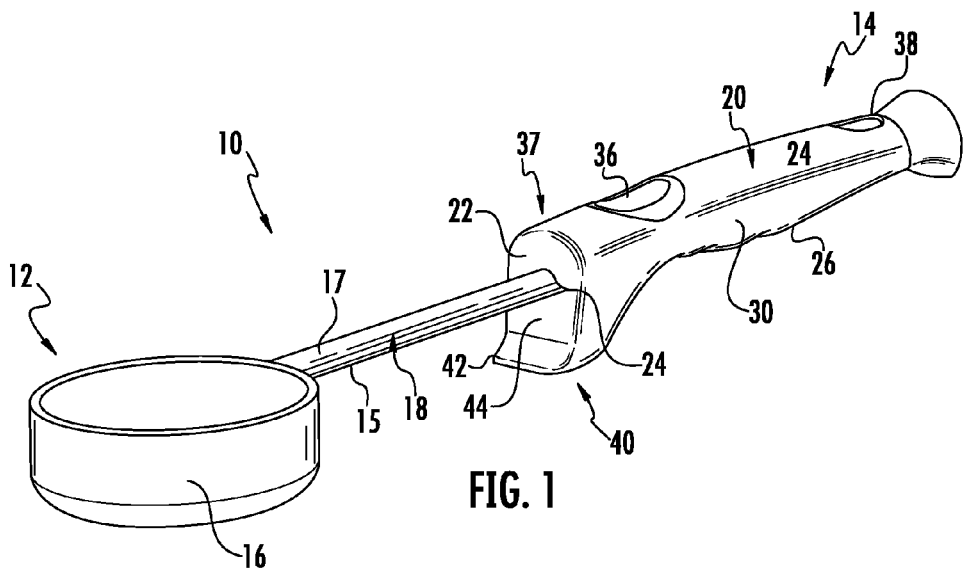
FIG. 1 is an isometric view of a serving utensil having a handle according to the present invention.
Figure 2:
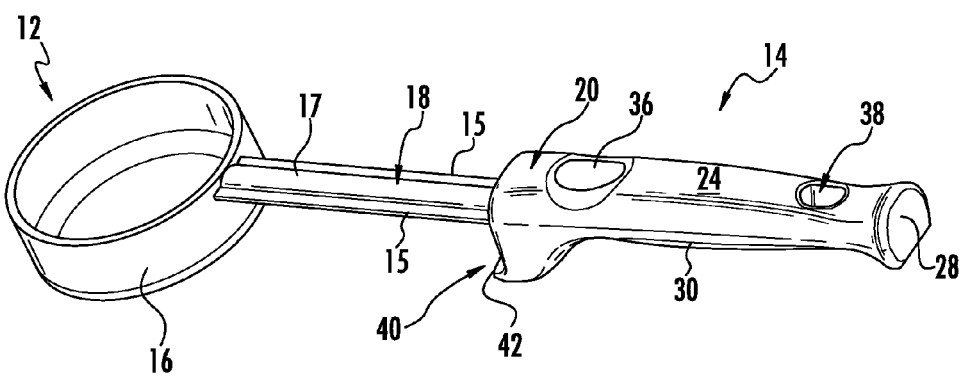
FIG. 2 is an isometric view of the serving utensil of FIG. 1 from another perspective.

Referring now to the drawings and FIGS. 1-9 in particular, a serving utensil 10 according to the present invention is shown. Serving utensil 10 includes a serving end 12 and a grasping end 14 opposite the serving end 12. Serving end 12 includes a serving element 16 for scooping food and serving it in a known manner. As illustrated serving element 16 comprises a standard bowl, but it is readily understood that serving element 16 may comprise any other known serving means such as a tines, prongs, tongs, and the like. Serving element 16 is generally configured such that it is sized and shaped to dispense a desired amount of food in an expedient manner. It is readily understood that serving element 16 may comprise a number of varying shapes and have any number of depths and circumferences in keeping with the spirit of the present invention. Further, serving element 16 is preferably constructed from a metal material such as, for example, stainless steel, aluminum or the like. Alternatively, serving element 16 may be constructed from a plastic.

A shank 18 is attached to, and preferably integrally formed with a surface of serving element 16 and extends toward the grasping end 14 of the utensil 10. Shank 18 is preferably constructed from the same material as serving element 16. Shank 18 is generally an elongate, substantially thin element configured to define a length between the grasping end 14 and the serving end 12. Shank 18 comprises a pair of lateral portions 15 on either side of a central portion 17. The lateral portions 15 and central portion 17 each extend along a length of the shank 18. Central portion 17 is raised with respect to the lateral portions 15. Further, central portion 17 is generally rounded and integrally formed with the lateral portions 15. Alternatively, shank 18 may comprise a substantially flat construction devoid of any contour.

Figure 9:
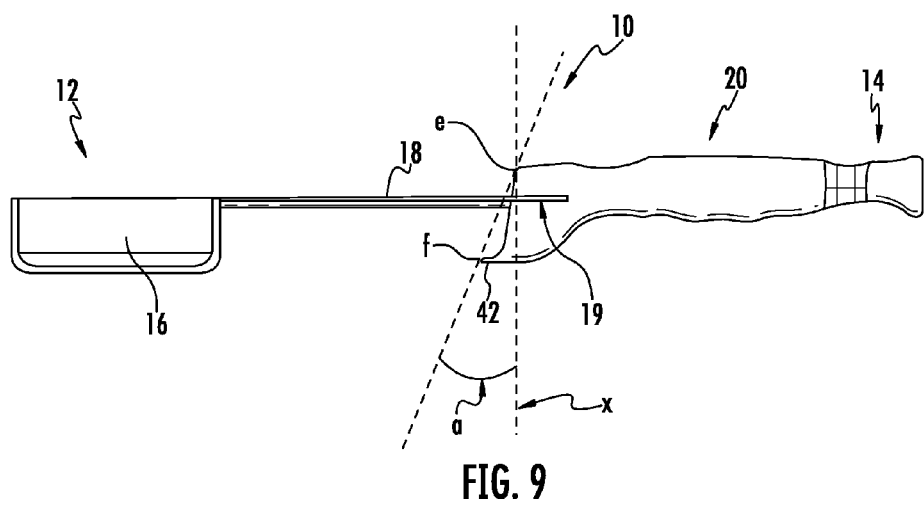
FIG. 9 is a side elevation cross-section of the serving utensil of FIG. 1.

Referring briefly to FIG. 9, shank 18 is received in a cavity 19 formed in a handle 20 carried on the grasping end 14 of utensil 10. A forward face 22 of handle 20 includes a laterally extending slit 24 for receiving one end of shank 18 for securing shank 18 to handle 20. Shank 18 is preferably secured in cavity 19 by way of a relatively strong adhesive or other such fixing means. Cavity 19 extends toward the grasping end 14 of utensil 10 a distance sufficient to provide a relatively secure receiving area for the shank 18 such that the shank 18 is well secured therein. Slit 24 and cavity 19 are configured to cooperate with the shape of shank 18. In particular, slit 24 comprises a shape configured to receive the lateral portions 15 and central portion 17. That is, a central portion of slit 24 is slightly raised with respect to the ends of slit 24 to accommodate the shape of shank 18 as is readily understood.

Figure 12:
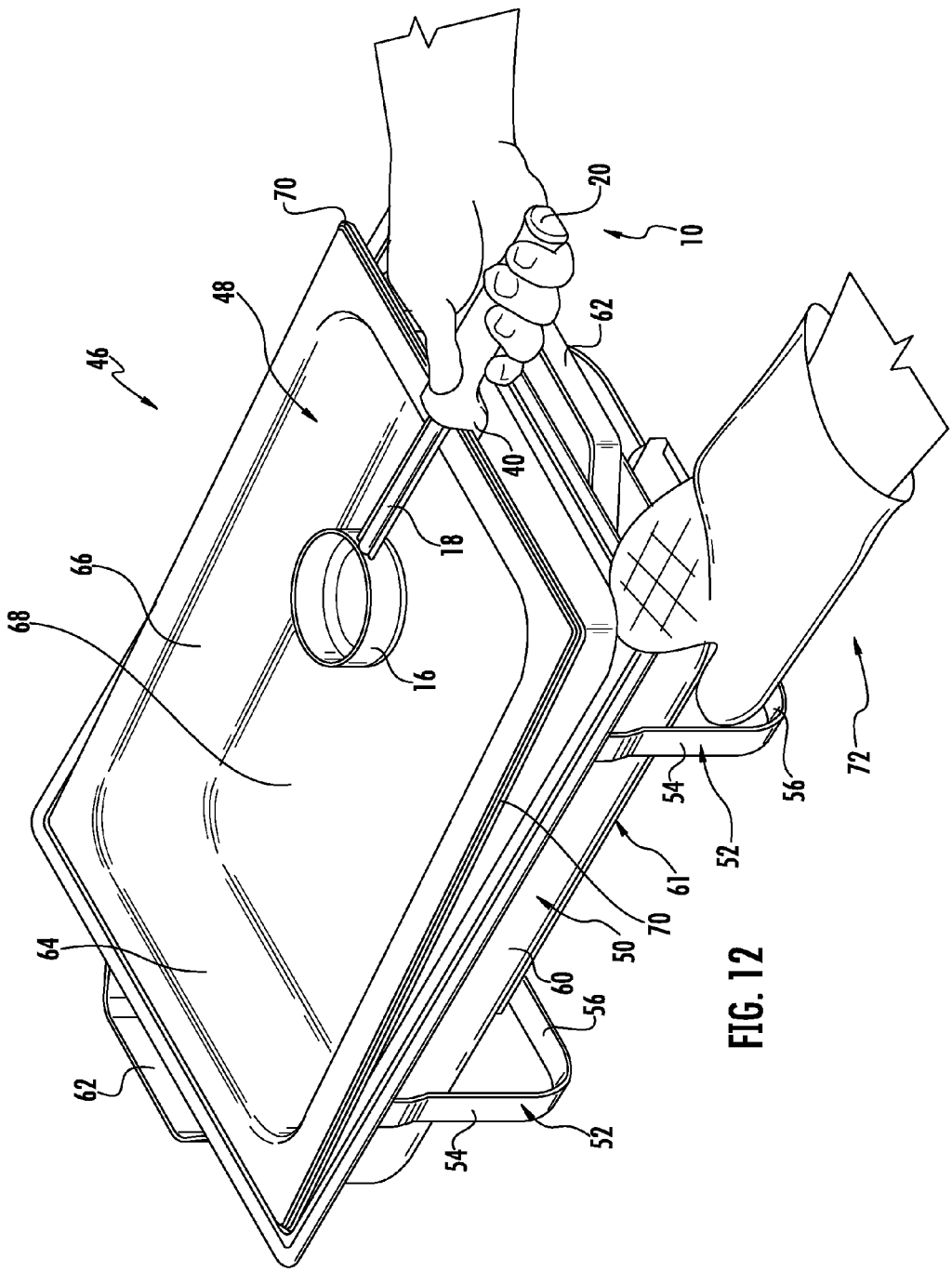
FIG. 12 is an isometric view of a user grasping the lifted pan with a gloved hand to thereby remove the pan from the steam table assembly.
Figure 13:
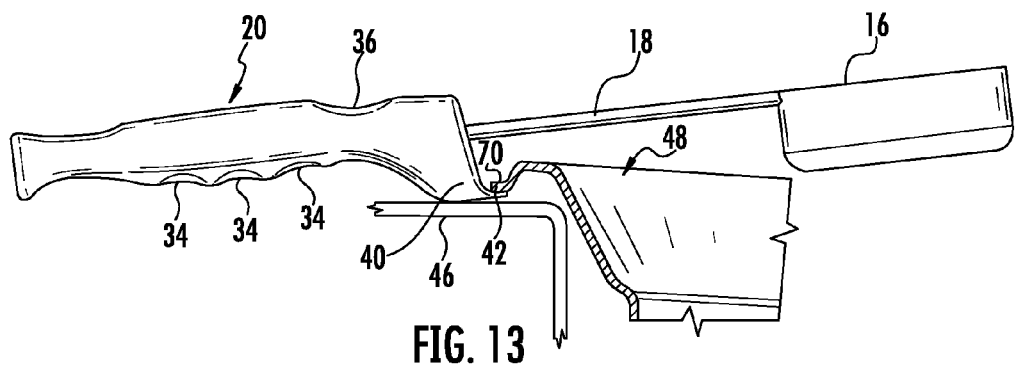
FIG. 13 is a side elevation view partial cross section of the utensil of the invention inserted between the steam table and the pan.

Referring momentarily to FIG. 12, it can be appreciated from reference thereto that shank 18 preferably comprises a length sufficient to position the user's hand at a distance away from pan 48. This is particularly advantageous in that it protects the user's hand from being burned by coming into contact with the pan 48, which are commonly kept quite warm as is generally understood. That is, the length of shank 18 serves to ensure that when the user engages the utensil 10 with pan 48 as will be described herein, and the user's hand is necessarily positioned at a significant distance from the pan 48 by virtue of the grasping of handle 20 during operation. Further, shank 18 serves to define an upper boundary such that the utensil handle 20 remains in contact with the lip 70 of pan 48 during lifting as can be appreciated by reference to FIG. 13 in particular.

Referring again to FIGS. 1-9, handle 20 comprises a standard utensil handle 20 adapted for receiving a user's hand. Handle 20 is preferably constructed from a plastic although other materials may be used in keeping with the spirit of the present invention such as a metal or natural material such as wood. Handle 20 includes a top surface 24, a bottom surface 26, a rear surface 28 and a pair of side surfaces 30, 32. Top surface 24 is adapted for receiving a palm of the user's hand as is readily understood while bottom surface 26 is adapted for receiving the user's fingers.

Looking to FIG. 9, an acute angle "a" is formed between a vertical axis "x" extending perpendicularly to the shank 18 and a line passing through a front edge "f" of the flange 42 and a top edge "e" of the forward face 22 of the handle 20.

Figure 3:
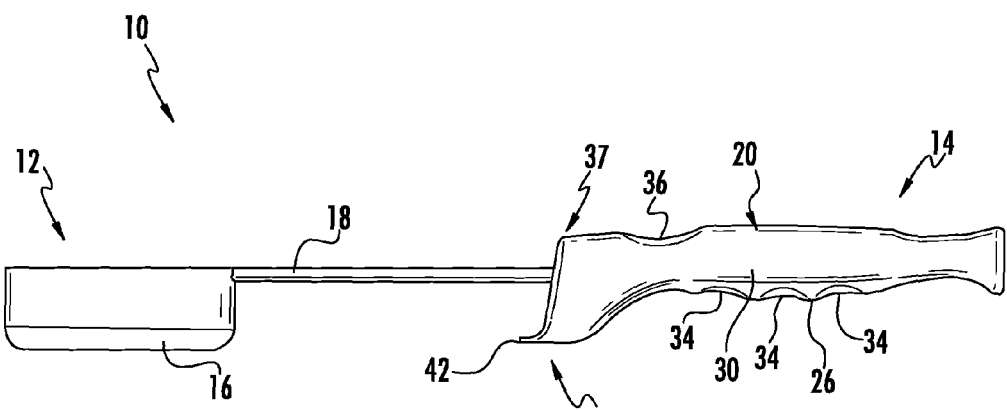
FIG. 3 is a side elevation view of the serving utensil of FIG. 1.
Figure 4:
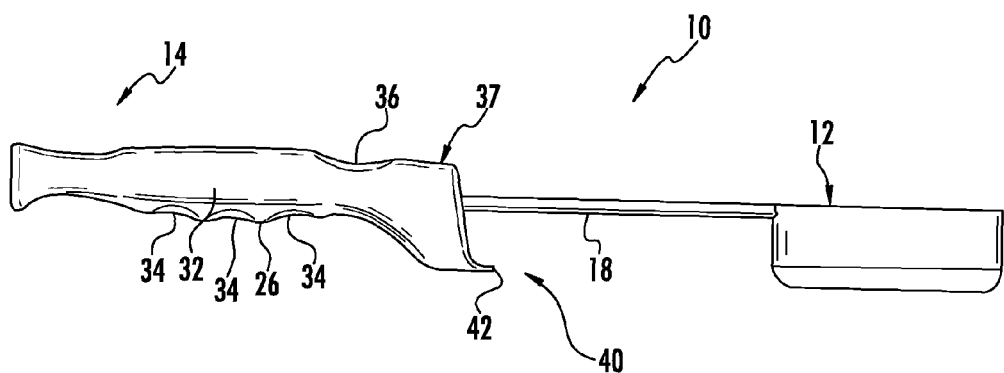
FIG. 4 is an opposite elevation view of the serving utensil of FIG. 3.
Figure 5:
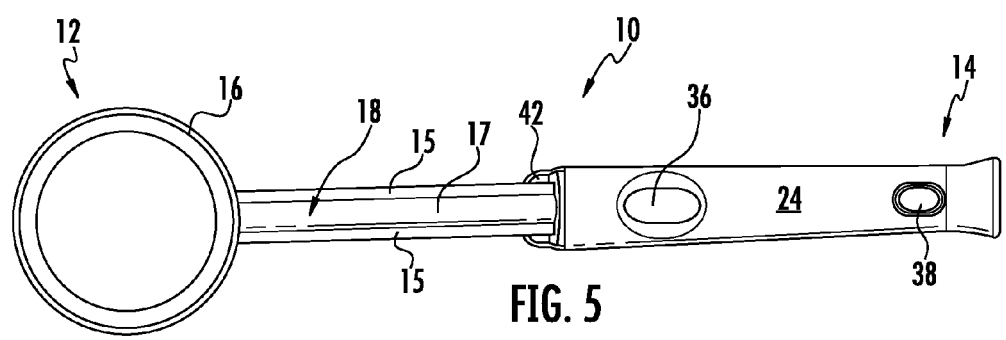
FIG. 5 is a top plan view of the serving utensil of FIG. 1.
Figure 6:
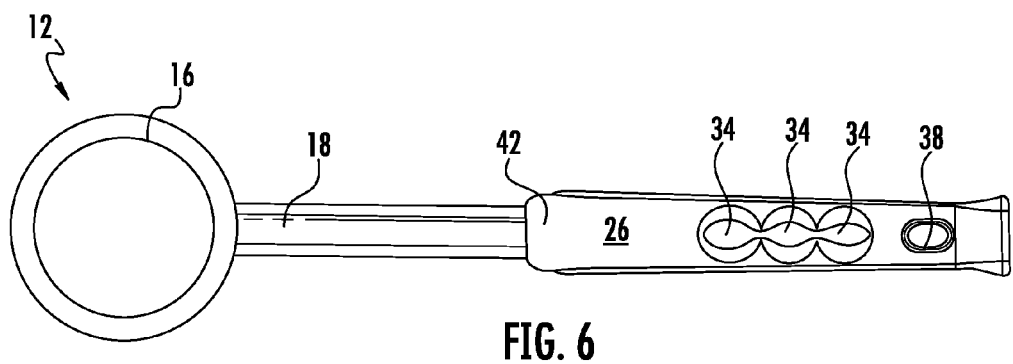
FIG. 6 is a bottom plan view of the serving utensil of FIG. 1.
Figure 7:
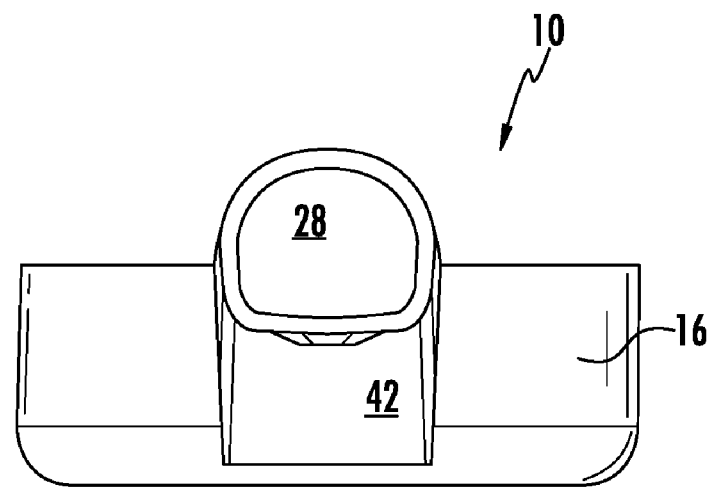
FIG. 7 is a handle end elevation view of the serving utensil of FIG. 1.
Figure 8:
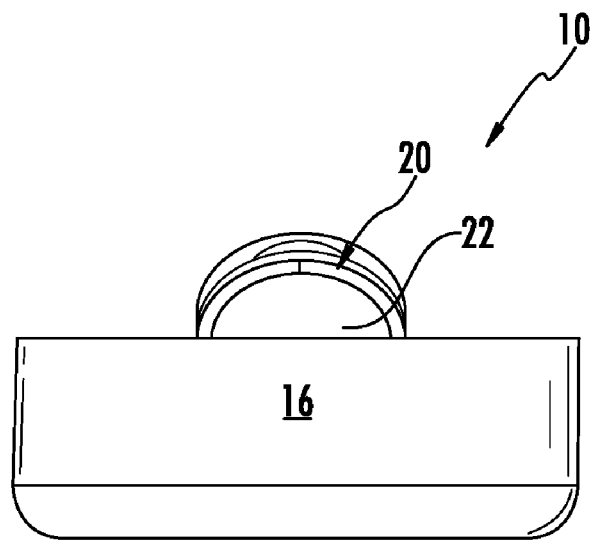
FIG. 8 is a bowl end elevation view of the serving utensil of FIG. 1.

With particular reference to FIGS. 3, 4, and 6, bottom surface 26 includes a number of grooves 34 extending transversely across the width of the handle 20 for receiving one of the user's fingers. Similarly top surface 24 includes a depression 36 at a forward end 37 thereof for receiving the user's thumb. Grooves 34 and depression 36 are further configured to assist the user in balancing while lifting pan 48 from steam tray 46. In particular, the manner in which the grooves 34 and depressions receive the user's fingers are optimally positioned such that when the user lifts the pan 48 the fingers are positioned in such a way that the pan 48 is lifted in a substantially balanced manner. In this way, accidental slippage of the pan 48 or spillage of the contents from pan 48 are prevented. Thus, accidental damage to the pan 48 from falls are reduced and clean up time is significantly reduced because the number of accidental spills are reduced. In addition, grooves 34 and depression 36 enhance the user's comfort such that use of the utensil 10 is desirable as opposed to other utensils known in the art. A rearward end of handle 20 includes an aperture 38 extending through top surface 24 and bottom surface 26. Aperture 38 may be used for receiving means for hanging the utensil 10 or the like. For instance, a strap (not shown) may be inserted through aperture 38 and tied around such that utensil 10 may be hung from a hook or other such means for storing utensil 10 when not in use. Rear surface 28 of handle 20 is preferably configured such that it is particularly blunt. In this way, rear surface 28 may be used for a number of food service operations that require that a blunt object or instrument be used for tapping or otherwise hammering an object. For instance, in the food service industry, food items are oftentimes stored in relatively large buckets or drums. The covers to these buckets are often difficult to seal in between uses and require that the cover be hammered onto the bucket to thereby seal the contents inside. Thus, the rear surface 28 of handle 20 may be used as a blunt instrument to hammer the cover onto the bucket to thereby seal the bucket for transport. As can be readily appreciated, it is known that the edges of steam table pans often become warped and bent over time, and thus, rear surface 28 may be employed to hammer out the dents and reform the pan in a desirable manner such that heat loss between the pan and the steam table is minimized as can be readily appreciated. A number of other instances whereby the use of blunt instrument for hammering or tapping an object may find the rear surface 28 to be of great use. As can be readily appreciated, handle 20 is preferably constructed from a relatively durable material have sufficient density such that not only handle 20, but the entirety of utensil 10 is capable of withstanding the many impacts imparted thereupon when using rear surface 28 in this manner. Accordingly, handle 20 may be constructed from a rubber or similar such material. Alternatively, rear surface 28 may have a reinforcement means coupled to the rear surface 28 to thereby provide shock absorption while maintaining the desirable light weight nature of utensil 10.

Forward face 22 of handle 20 serves to provide a barrier between the user's hand and the pan 48. In this manner, the user is further protected from accidentally burning his or her hands by coming into contact with a warm surface of pan 48.

Forward end 37 of handle 20 defines an engagement structure 40 for selectively engaging an edge of a serving pan as will be explained in detail herein. Engagement structure 40 is integrally formed with forward face 22 of handle 20. Engagement structure 40 comprises a relatively slender flange 42 extending from a curved portion 44 of forward face 22 of handle 20 toward the serving end 12 of the utensil 10. Curved portion 44 of forward face 22 is integrally formed with the forward face 22 and begins at a predetermined point along a longitudinal axis of the forward face 22. Curved portion 44 gradually curves toward the serving end 12 of the utensil 10 and terminates in the flange 42. Flange 42 extends substantially horizontally from forward face 22.

In a preferred embodiment of the invention, utensil 10 is approximately 12-14 inches in length. The serving end 12 of utensil 10 is approximately 6¾ inches in length and grasping end 14 comprises the remainder of the length of utensil 10 or approximately 6-6½ inches in length. Handle 20 defines a maximum height of utensil 10 of approximately 1½ inches. Handle 20 generally has a width of approximately 1 inch along the length of the handle 20. Shank 18 is generally positioned approximately ⅘ inch from a bottom-most portion of handle 20 defined by flange 42.

Flange 42 is sized and shaped to advantageously slide under the lip 70 (see FIGS. 10-13) of pan 48 without excessive contact to the lip 70 to thereby prevent damage thereto. As is readily understood, if flange 42 is sized too large, when the user attempts to slide the flange 42 under the lip 70, the flange 42 will come into abutting contact with lip 70 such that damage may be caused. It is known in the art that damage caused to the lips 70 of pans 48 is highly undesirable for a number of reasons. When lips 70 become damaged, the seal between pans 48 and steam tables 46 is compromised such that heat transfer between the steam table 46 and pan 48 is adversely impacted. In other words, a great amount of heat is allowed to escape from the steam table 46 without heating the contents of pan 48 thus a greater amount of heat is necessary to maintain the food at a desirable temperature such that the proprietor of the buffet must spend a great deal more money on heating elements, i.e., candle lamps. Alternatively, the food is served to the customers cold, which can have a negative impact on the customer's experience and adversely affect the possibility of return business. Further, damaged pans 48 are not aesthetically pleasing. Thus, to prevent the previously articulated adverse consequences, the proprietor of the buffet must replace the pans 48 once the lips 70 become damaged thereby increasing the costs of their operation.

The curved portion 44 of forward face 22 generally begins at a point between an upper most portion of the forward face 22 and the location at which the shank 18 is inserted into the forward face 22 as described previously. Further, the overall length of the curved portion 44 is approximately ½ inch extending from forward face 22 and terminating in flange 42. Flange 42 generally comprises a width of approximately 0.06 inches. It is understood that these measurements may be modified in keeping with the spirit of the invention. The forward face 22 comprises a slope extending from the upper surface 24 of handle 20 and extending toward the curved portion 44. The forward face 22 is generally sloped between 5-15 degrees, although the forward face could be completely vertically oriented or comprise a substantially greater slope as is readily understood.

Flange 42 is also configured to serve as a slide stop with respect to utensil 10. In particular, in operation, flange 42 serves to prevent utensil 10 from sliding forward and into the pan 48. In particular, in operation, when a server or customer is finished using utensil 10 to serve food onto a plate, bowl or other such dinnerware, he or she may rest utensil 10 on lip 70 of pan 48 by way of flange 42. In this manner, utensil 10 is readily available for subsequent use. Further, it prevents utensil 10 from becoming dirty from contacting the food contents of pan 48 as may be readily appreciated. While prior designs have contemplated providing means on a utensil for preventing sliding of the utensil into the cavity of the pan, the design of flange 42 is such that not only does flange 42 provide a slide stop, but it is also configured for lifting pan 48 from steam table 44, which previous designs lacked.

Figure 10:
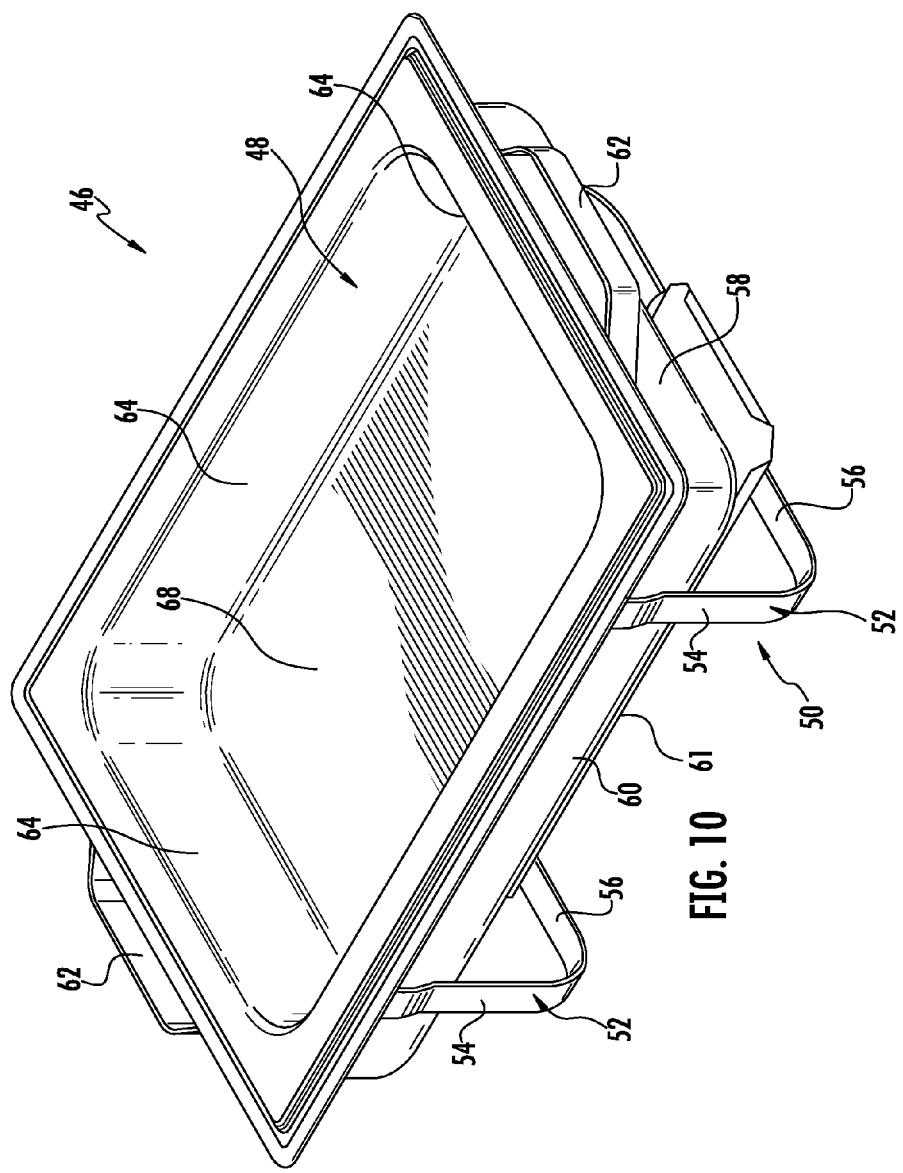
FIG. 10 is an isometric view of a steam table assembly.
Figure 11:
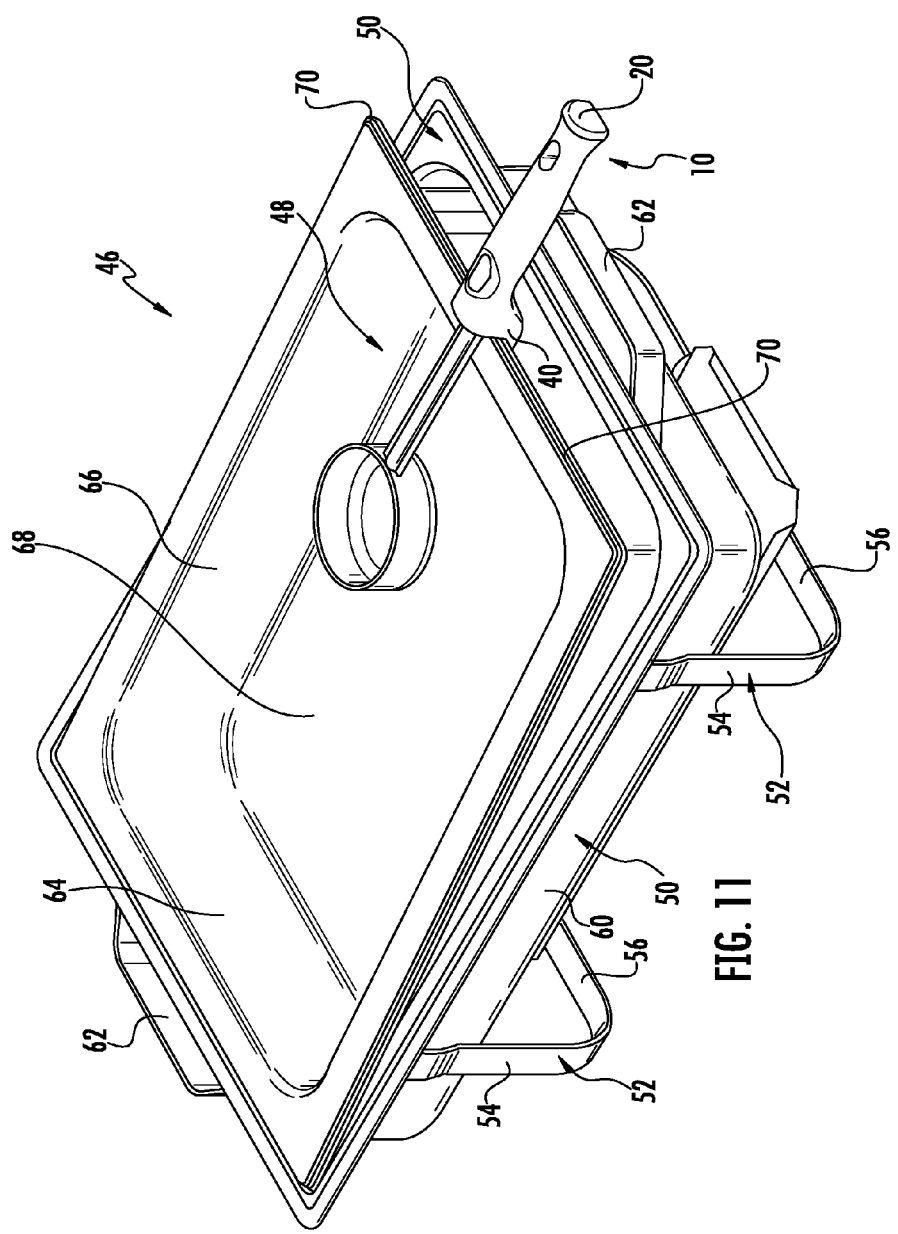
FIG. 11 is an isometric view of the serving utensil of the present invention engaged with a pan of the steam table assembly and lifting the pan from the steam table.

Referring now to FIGS. 10-12, and initially FIG. 10, a steam table assembly 46 is illustrated in which the steam table assembly 46 comprises a pan 48 received within a cavity defined by a frame 50. Frame 50 comprises a cavity for snugly receiving pan 48 in a nesting manner. A pair of supports 52 is secured to an underside of frame 50 and extends across the width of steam table assembly 46. Supports 52 generally comprise a U-shaped construction having a pair of generally upright portions 54 attached to each of the sides of the frame 50 and a central portion 56 disposed between the upright portions. Frame 50 includes a pair of end walls 58, a pair of side walls 60 disposed therebetween, and a bottom wall 61, thereby defining an upwardly facing cavity for receiving the pan 48. On each of the end walls 58 is a handle 62 for grasping by a user for moving the steam table assembly 46 from place to place. Frame 50 is generally constructed from a metal material such as stainless steel or aluminum. Preferably, the material of frame 50 is a good conductor of heat such that the contents of the steam table assembly 46 may be maintained at a desired temperature by applying an external heat or cooling element to the frame 50 such that the heat transfer occurs through the frame 50 and to the pan 48 and the contents thereof.

Pan 48 comprises a construction substantially similar to that of frame 50. Pan 48 includes a pair of opposing end walls 64, a pair of opposing side walls 66 disposed therebetween, and a bottom wall 68 to thereby define a cavity for receiving food items therein. Pan 48 includes a lip portion 70 that extends around the perimeter of the pan 48 at upper edges of each of the side walls 66 and end walls 64. Lip portion 70 is configured to cooperate with the upper edges of the side walls 60 and end walls 58 of the frame 50 such that the pan 48 is secured thereto. In this manner, the pan 48 is secured in place such that it is not easily removed by bumping or contact therewith such that the steam table assembly 46 comprises a relatively robust structure.

Referring now to FIGS. 11-12 in particular, utensil 10 is shown in operation and engaging the pan 48 to thereby lift it from the frame 50. Utensil 10 is generally slid into engagement with lip portion 70 of pan 48 while being positioned substantially horizontally as shown. Thus, the utensil 10 is slid into engagement with pan 48, and in particular, flange 42 of engagement structure 40 is engaged with the lip portion 70. More particularly, flange 42 is inserted between the pan 48 and the frame 50 such that the user thereof is able to simply apply a relatively small amount of upward force on the handle 20 to urge the pan 48 from the frame 50 such that the lip portion 70 becomes unengaged with the upper edges of the corresponding walls of the frame 50. In this manner, one end 64 of pan 48 is free for lifting from the frame 50. As can best be seen from reference to FIG. 12, a user 72 is shown grasping the utensil 10 in one hand and lifting the pan 48 from frame 50 with a gloved hand. In this manner, the user is able to easily and safely remove pan 48 such that it may be replaced by another pan 48 or taken to another location for cleaning.

It is intended that the appended claims cover all such additions, modifications and rearrangements. Expedient embodiments of the present invention are differentiated by the appended claims.

What is claimed is:

1. A utensil comprising:
   a first end having a serving element disposed thereon and a second end opposite the first end having a handle disposed thereon;
   a shank having a forward end and a rearward end, wherein the forward end is coupled to the serving element and the rearward end is coupled to the handle;
   a pan lifting element disposed on the handle and extending toward the first end of the utensil, wherein the pan lifting element is configured to engage an edge of a serving pan for allowing a user to lift the serving pan with the utensil;
   wherein the pan lifting element comprises a flange extending generally horizontally from a forward face of the handle at a point below where the shank is coupled to the handle and wherein an acute angle is formed between a vertical axis extending perpendicularly to the shank and a line passing through a front edge of the flange and a top edge of the forward face of the handle.

2. The utensil of claim 1, wherein the acute angle is approximately 45 degrees.

3. The utensil of claim 2, wherein the flange is sized to engage an edge of the serving pan.

4. The utensil of claim 1, wherein the flange is integrally formed with the handle.

5. The utensil of claim 4, wherein the flange is positioned such that it is engageable with an underside of an edge of the serving pan when the serving element is inserted over a cavity of the serving pan.

6. The utensil of claim 4, wherein the flange extends downwardly from a mid portion of the utensil.

7. The utensil of claim 1, wherein the flange of the pan lifting element is configured for engagement with the serving pan such that the serving pan abuts at least a portion of the pan lifting element when engaged with the flange thereof.

8. The utensil of claim 1, wherein the flange is integrally molded to the handle.

9. The utensil of claim 1, wherein the flange has a length sufficient to enable the flange to engage an edge of the serving pan.

10. The utensil of claim 1, wherein the flange is sized to engage an edge of the serving pan.

11. The utensil of claim 1, wherein the flange is positioned such that it is engageable with an underside of an edge of the serving pan when the serving element is inserted over a cavity of the serving pan.

12. The utensil of claim 1, wherein the pan lifting element includes a curved portion;
   wherein the curved portion and the flange are configured to engage the pan and suspend the pan from the flange.

13. A utensil comprising:
   a first end having a serving element disposed thereon and a second end opposite the first end having a handle disposed thereon;
   a shank having a forward end and a rearward end, wherein the forward end is coupled to the serving element and the rearward end is coupled to the handle;
   a pan lifting element comprising a width of approximately 0.06 inches is disposed on the handle and extending toward the first end of the utensil, wherein the pan lifting element is configured to engage a serving pan for allowing a user to lift the serving pan with the utensil;
   wherein the pan lifting element comprises a flange extending generally horizontally from a forward face of the handle at a point below where the shank is coupled to the handle and wherein an acute angle is formed between a vertical axis extending perpendicularly to the shank and a line passing through a front edge of the flange and a top edge of the forward face of the handle.

14. A utensil comprising:
   a first end having a serving element disposed thereon and a second end opposite the first end having a handle disposed thereon;
   a shank having a forward end and a rearward end, wherein the forward end is coupled to the serving element and the rearward end is coupled to the handle;

a pan lifting element disposed on the handle and extending toward the first end of the utensil, wherein the pan lifting element is configured to engage a serving pan for suspending the pan from the utensil;

wherein the pan lifting element comprises a flange extending generally horizontally from a forward face of the handle at a point below where the shank is coupled to the handle and wherein an acute angle is formed between a vertical axis extending perpendicularly to the shank and a line passing through a front edge of the flange and a top edge of the forward face of the handle.

* * * * *